(12) United States Patent
Ameling

(10) Patent No.: US 10,805,115 B2
(45) Date of Patent: Oct. 13, 2020

(54) INTERNET OF THINGS (IOT) GATEWAY

(71) Applicant: SAP SE, Walldorf (DE)

(72) Inventor: Michael Ameling, Dresden (DE)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 15/241,048

(22) Filed: Aug. 18, 2016

(65) Prior Publication Data

US 2018/0054327 A1  Feb. 22, 2018

(51) Int. Cl.
*H04L 29/08* (2006.01)
*H04L 12/66* (2006.01)

(52) U.S. Cl.
CPC .............. *H04L 12/66* (2013.01); *H04L 67/12* (2013.01); *H04L 67/02* (2013.01); *H04L 67/32* (2013.01)

(58) Field of Classification Search
CPC ................................ H04L 12/66; H04L 67/02
USPC .......................................................... 709/219
See application file for complete search history.

(56) References Cited

U.S. PATENT DOCUMENTS

| | | | | |
|---|---|---|---|---|
| 10,291,477 B1* | 5/2019 | Askar | ...................... | H04W 4/50 |
| 2008/0227391 A1* | 9/2008 | Rosenberg | ......... | G06Q 20/3226 455/41.1 |
| 2010/0262467 A1* | 10/2010 | Barnhill, Jr. | ........ | H04L 12/2809 709/223 |
| 2014/0241354 A1* | 8/2014 | Shuman | ................... | H04L 67/16 370/390 |
| 2015/0074582 A1* | 3/2015 | Shearer | ................. | H04L 12/282 715/771 |
| 2016/0055573 A1* | 2/2016 | Chen | ................... | G06Q 30/0641 705/26.41 |
| 2016/0065653 A1* | 3/2016 | Chen | ....................... | H04L 67/34 715/735 |
| 2016/0197772 A1* | 7/2016 | Britt | ........................ | H04W 4/70 370/254 |
| 2016/0198536 A1* | 7/2016 | Britt | ...................... | H02J 7/0042 315/149 |
| 2017/0339252 A1* | 11/2017 | Hamill | ..................... | H04L 67/02 |
| 2017/0359417 A1* | 12/2017 | Chen | ....................... | H04L 67/12 |
| 2018/0007140 A1* | 1/2018 | Brickell | ................ | H04L 67/125 |
| 2018/0048710 A1* | 2/2018 | Altin | ..................... | H04W 76/10 |

* cited by examiner

*Primary Examiner* — William G Trost, IV
*Assistant Examiner* — Christopher P Cadorna
(74) *Attorney, Agent, or Firm* — Buckley, Maschoff & Talwalkar LLC

(57) ABSTRACT

Various embodiments of systems, computer program products, and methods for providing Internet of Things (IoT) gateway are described herein. In an aspect, a selection of an Internet of Things (IoT) gateway application is received. A device model in the IoT gateway application is generated. The device model includes one or more device types and corresponding device specific message type definitions. Further, one or more devices corresponding to the one or more device types are identified. Upon receiving a selection of one or more of the identified one or more devices, the selected one or more devices are registered to communicate structured data associated with the registered one or more devices with a selected at least one landscape via the Internet based on the device specific message type definitions.

17 Claims, 10 Drawing Sheets

APPLICATION DATA

↓ REFRESH    LAST UPDATED ON 3 FEBRUARY 2016 AT 12.03.09 GMT+1

TABLE IOTMMS_T_IOT_5D66A8E050E9E9C5B380 CONTAINS 199 ROWS. (50 ROWS LOADED. NEWEST ON TOP.)

| G_DEVICE | G_CREATED | C_TEMPERATURE | C_PRESSURE | C_ACCELERATIONX | C_ACCELERATIONY | C_ACCELERATION_TIMESTAMP |
|---|---|---|---|---|---|---|
| 9C175B98-1C9C-4183-B456-7A54D3A19544 | WED FEB 03 2016 12:03:20 GMT+0100(CET) | 21.0 | 999.01001 | -0.001953 | -0.005981 | 1454497399 |
| 9C175B98-1C9C-4183-B456-7A54D3A19544 | WED FEB 03 2016 12:03:20 GMT+0100(CET) | 21.0 | 999.0 | -0.003479 | -0.00647 | 1454497398 |
| 9C175B98-1C9C-4183-B456-7A54D3A19544 | WED FEB 03 2016 12:03:20 GMT+0100(CET) | 21.0 | 999.0 | -0.002014 | -0.005432 | 1454497397 |
| 9C175B98-1C9C-4183-B456-7A54D3A19544 | WED FEB 03 2016 12:03:20 GMT+0100(CET) | 21.0 | 999.02002 | -0.003357 | -0.007263 | 1454497396 |
| 9C175B98-1C9C-4183-B456-7A54D3A19544 | WED FEB 03 2016 12:03:20 GMT+0100(CET) | 21.0 | 998.97998 | -0.002625 | -0.006226 | 1454497395 |
| 9C175B98-1C9C-4183-B456-7A54D3A19544 | WED FEB 03 2016 12:03:15 GMT+0100(CET) | 21.0 | 998.98999 | -0.002747 | -0.005615 | 1454447394 |
| 9C175B98-1C9C-4183-B456-7A54D3A19544 | WED FEB 03 2016 12:03:15 GMT+0100(CET) | 21.0 | 999.01001 | -0.003052 | -0.006104 | 1454497393 |

FIG. 5D

INTERNET OF THINGS (IOT) GATEWAY

BACKGROUND

In Internet of Things (IoT), one of the challenges may be heterogeneity, which stems from the diversity of the devices in terms of sensor variety (e.g., temperature sensors, acceleration sensors and the like), message types (e.g., integer, double value and the like), message frequency and the like. Also, the devices (e.g., wearables, sensor tags and the like) may be equipped with short-distance interface technology such as Bluetooth low energy (BLE). Thereby, the devices may not have the capability to send requests via the Internet, which is a prerequisite to communicate with public cloud offerings. Further, communication through other technologies such as a Raspberry Pi® may require programming skills and a complex technical setup (e.g., connectivity over corporate WiFi and the like).

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

FIG. 4A is an exemplary graphical user interface (GUI) illustrating selecting a device for registration, according to an embodiment.

FIG. 4B is an exemplary graphical user interface (GUI) illustrating registering a device for communicating data with a landscape, according to an embodiment.

FIG. 5D is an exemplary graphical user interface (GUI) displaying communicated data or messages, according to an embodiment.

DETAILED DESCRIPTION

Embodiments of techniques to provide Internet of Things (IoT) gateway are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In another instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted.

In this document, various computer-implemented methods, processes and procedures are described. It is to be understood that the various actions (determining, identifying, receiving, storing, retrieving, and so on) may be performed by a hardware device (e.g., computing system), even if the action may be authorized, initiated or triggered by a user, or even if the hardware device is controlled by a computer program, software, firmware, and the like. Further, it is to be understood that the hardware device may be operating on data, even if the data may represent concepts or real-world objects, thus the explicit labeling as "data" as such may be omitted.

Figure 1:
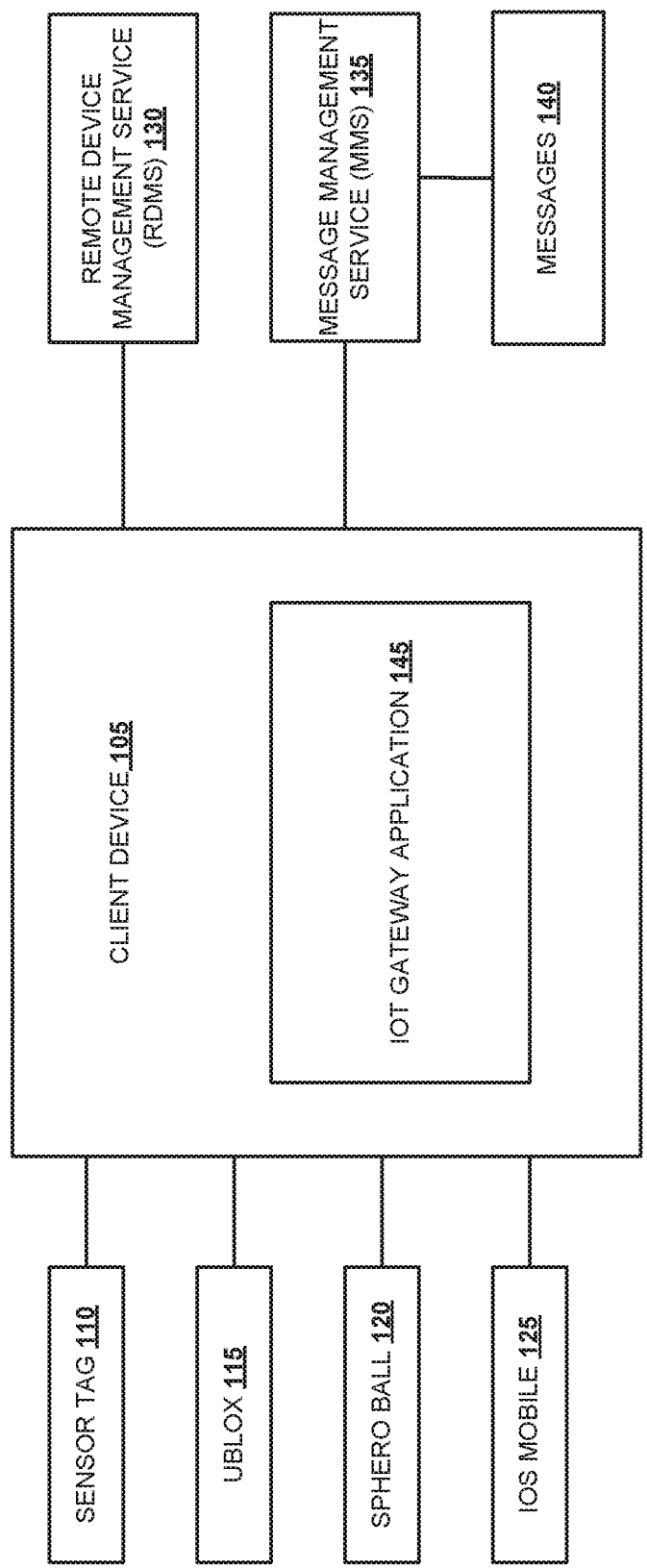
FIG. 1 is a block diagram of a computing environment illustrating an Internet of Things (IoT) gateway, according to an embodiment.

FIG. 1 is a block diagram of a computing environment illustrating an Internet of Things (IoT) gateway, according to an embodiment. The block diagram illustrates an IoT gateway application (e.g., 145) installed in a client device (e.g., 105), which enables to onboard devices or IoT devices to use capabilities of public cloud offerings such as IoT services (e.g., the IoT services can be, but not limited to, remote device management services, message management services, and/or authorization management services). In one example, the devices may represent real objects, which can be uniquely identified. The devices enables communication or transfer of data over a wireless or a wired network technology such as, but not limited to, Insteon®, Infrared Data Association (IrDA®), Bluetooth®, Z-Wave®, ZigBee®, Controller Area Network (CAN) bus and Body Area Network (BAN), for instance. Further, the devices can be heterogeneous devices, having different configurations, processors, functionalities, message type definitions and message frequencies. For example, the devices can be, but not limited to, "Sensor Tag" 110, "Ublox" 115, "Sphero Ball" 120 and "iOS Mobile" 125. The client device 105 can be a computing device supporting the Internet, such as but limited to a smart phone, a desktop computer, and a laptop.

In one exemplary embodiment, the IoT gateway application (e.g., 145) may enable onboarding of the at least one device (e.g., the "Sensor Tag" 110, the "Ublox" 115, the "Sphero Ball" 120, and the "iOS Mobile" 125) using the IoT services. The IoT gateway application may generate a device model and register the devices (e.g., the "Sensor Tag" 110, the "Ublox" 115, the "Sphero Ball" 120 and the "iOS Mobile" 125) in the IoT gateway application (e.g., 145) via a remote device management service (RDMS) (e.g., 130). The device model may include one or more device types (e.g., IoT device types can be "CC2650" (e.g., for device "Sensor Tag"), "OLP425" (e.g., for device "Ublox"), "Sphero" (e.g., for device "Sphero Ball"), "iOS Mobile" (e.g., for "iOS device")) and corresponding device specific message type definitions (e.g., "CC2650Data", "OLP425Data", "iOSMobileData", and "SpheroData"). Since the device model is generated in the IoT gateway application, the IoT gateway application is aware of the devices (e.g., the "Sensor Tag" 110, the "Ublox" 115, the "Sphero Ball" 120, and the "iOS Mobile" 125). In one exemplary embodiment, the IoT gateway application may communicate data or messages (e.g., 140) in a structured format to a selected landscape or a data center via a message management service (MMS) (e.g., 135). In one example, the client device 105 is provided an option to select a desired landscape or a data center (e.g., Cloud) to communicate the messages 140 via the IoT gateway application (e.g., 145).

In one exemplary embodiment, upon generating the device model, an account associated with the device model can be secured via authentication. For example, the account can be secured by, but not limited to single sign-on (SSO) and certificate based authentication. Therefore, through the IoT gateway application (e.g., 145), an automatic onboarding of devices (e.g., the "Sensor Tag" 110, the "Ublox" 115, the "Sphero Ball" 120, and the "iOS Mobile" 125) can be achieved and thus provides the gateway for accessing the IoT services and process all communication (e.g., sending and receiving messages) on behalf of the devices.

In one exemplary embodiment, the IoT gateway application (e.g., 145) enables to share the configuration and the landscape. The configuration may include the device model having registered devices (e.g., the "Sensor Tag" 110, the "Ublox" 115, the "Sphero Ball" 120, and the "iOS Mobile" 125). Thereby, the device model can be shared with another client device. In other words, by sharing the configuration, the devices (e.g., the "Sensor Tag" 110, the "Ublox" 115, the "Sphero Ball" 120, and the "iOS Mobile" 125) can be connected to another IoT gateway application installed in another client device during maintenance or replacement of the client device 105 to provide high availability, for instance.

Figure 2:
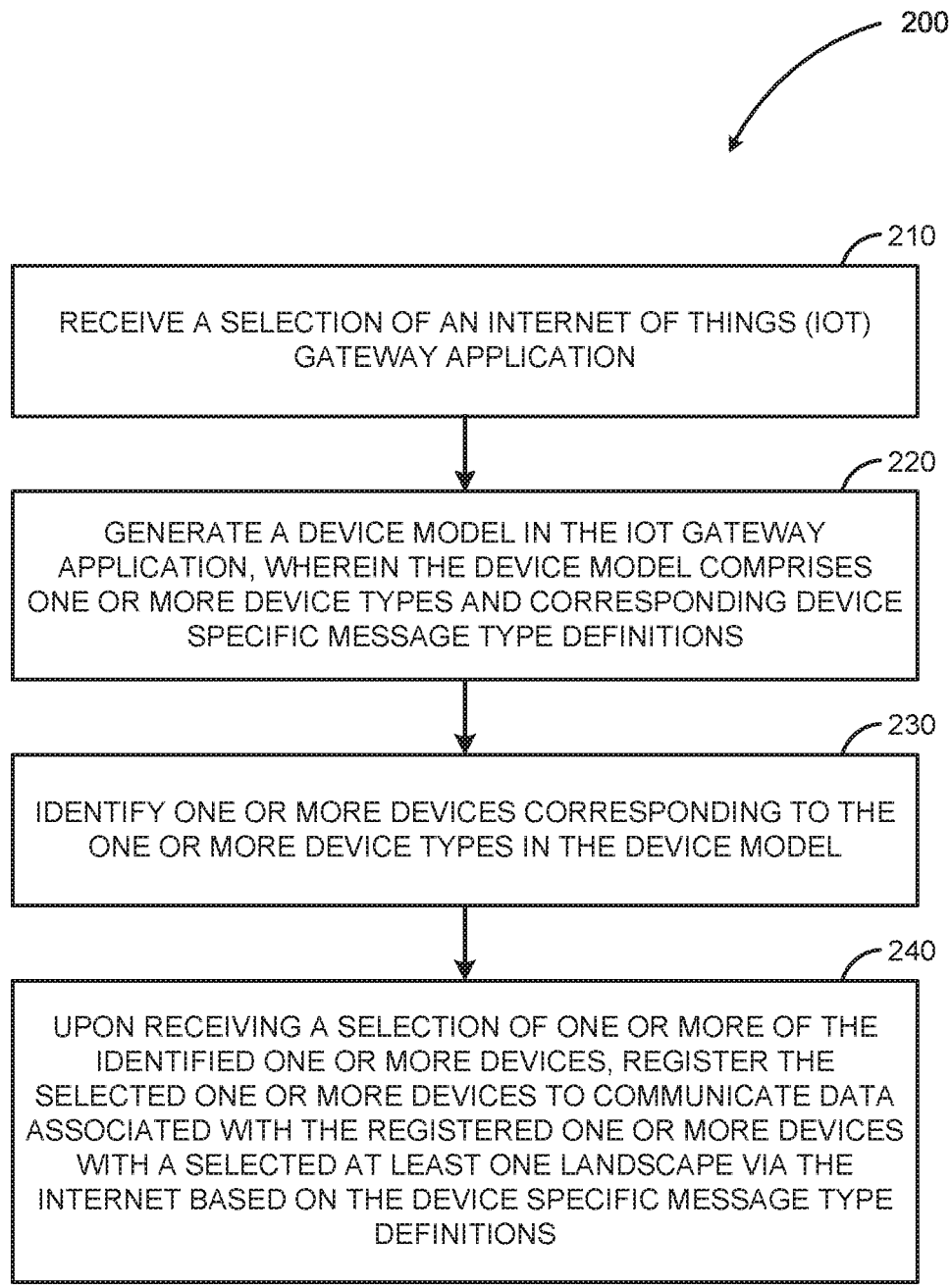
FIG. 2 is a flow diagram illustrating an example process to provide Internet of Things (IoT) gateway, according to an embodiment.

FIG. 2 is a flow diagram illustrating example process 200 to provide Internet of Things (IoT) gateway, according to an embodiment. Process 200 may be performed by a client device such as the client device 105 of FIG. 1. At 210, a selection of an IoT gateway application is received. The IoT gateway application can be one of a web application, a native application and a hybrid application. The native application can be an application program developed for use on a particular platform or the client device. The web application can be a client-server software application in which user interface runs in a web browser. The hybrid application can be the web application in a native browser, which follows a hybrid approach of web and native capabilities (e.g., the hybrid approach for mobile devices can be Apache® Cordova™). Further, the IoT gateway application may be an on premise application or an on-demand application (i.e., stored in the cloud). On-premises application may be installed and run on computing system on the premises of an organization, rather than at a remote facility such as a server farm or cloud as in the case of the on-demand application.

At 220, a device model is generated in the IoT gateway application. The device model may include one or more device types and corresponding device specific message type definitions. In one exemplary embodiment, generating the device model may include receiving a selection of the one or more device types. In the IoT gateway application, a list of device types may be available (e.g., as templates, which are manually entered) or generated automatically based on device information (e.g., devices that are currently available or connected to the IoT gateway application). The device types can be, but not limited to, "CC2650" (e.g., for device "Sensor Tag"), "OLP425" (e.g., for device "Ublox"), "Sphero" (e.g., for device "Sphero Ball"), "iOS Mobile" (e.g., for "iOS device"). In other words, the device model may include device type specific information (e.g., for example custom properties such as identifiers and the like), and supported message type definitions. The message types may define a structured information of data such as, but not limited to, "CC2650Data", "OLP425Data", "iOSMobileData", and "SpheroData". In one exemplary embodiment, a remote device management service (RDMS) application programming interface (API) of the IoT services may generate the device model, and register devices associated with the device types in the device model.

In one exemplary embodiment, the device specific message type definitions supported by the device types are generated automatically or manually. An automatic generation may be based on the information provided by interfaces of the devices. For example, in case a device provides temperature information with a timestamp in Date format and a value as Integer, an according message type is defined. Therefore, a structured information or data is provided during data ingestion. In another example, the device specific message type definition can be done manually, where the data can be reduced to the data of interest. Thereby, the data may be provided in a structured format because of the message type definition. In another example, the data may be provided in an unstructured format (e.g., no message type definition) to a landscape. With this scenario, there may be no mapping necessary between device specific data fields and a target structure since the method allows to generate the message type automatically on the device information.

At 230, one or more devices corresponding to the device types in the device model are identified. In one exemplary embodiment, the devices (e.g., health devices (e.g., "pulse sensor"), smart home devices (e.g., "temperature sensor"), "Ublox", "Sphero Ball", and "iOS Mobile") may support wireless or wired communication (e.g., Insteon®, Infrared Data Association (IrDA®), Bluetooth®, Z-Wave®, ZigBee®, Controller Area Network (CAN) Bus and Body Area Network (BAN)) and active (e.g., switched on) in the vicinity of the client device. In one example, the devices are identified based on short-distance communication characteristics (e.g., Bluetooth® characteristics) and media access control address (MAC) of the client device.

At 240, upon receiving a selection of one or more of the identified one or more devices, the selected one or more devices are registered to communicate structured data associated with the registered one or more devices with a selected at least one landscape via the Internet based on the device specific message type definitions. In one exemplary embodiment, a message management application programming interface (API) of the IoT services may be used to communicate the data with a defined frequency. Further, the IoT gateway application enables to select the at least one landscape for communicating the data. Further, multiple landscapes may be configured. In other words, a device may be registered at multiple landscapes (e.g., with the same or different device models). Thereby, the data can be communicated (e.g., in the same or different message format based on the message type definitions of the device model) to multiple landscapes to ensure resilience or allow data replication.

The described embodiments provide the IoT gateway via the IoT gateway application to communicate the data with the landscape (e.g., Cloud). Thereby, the data from the cloud can be accessed any time. The benefit of such an arrangement besides Internet access, is that the implemented client device (e.g., laptops, tablets and smartphones) may not need any major programs and the client device may run a Web browser that provides access to the cloud providers' applications and services.

Figure 3B:
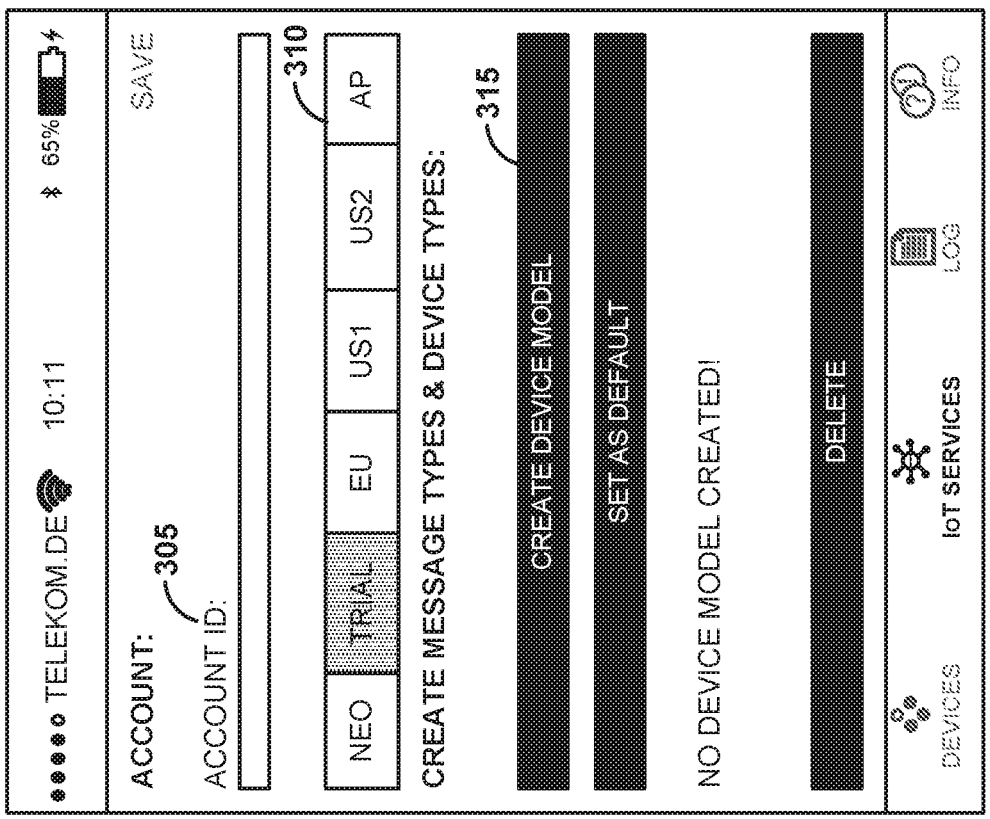
FIG. 3B is an exemplary graphical user interface (GUI) illustrating generating a device model, according to an embodiment.
Figure 3A:
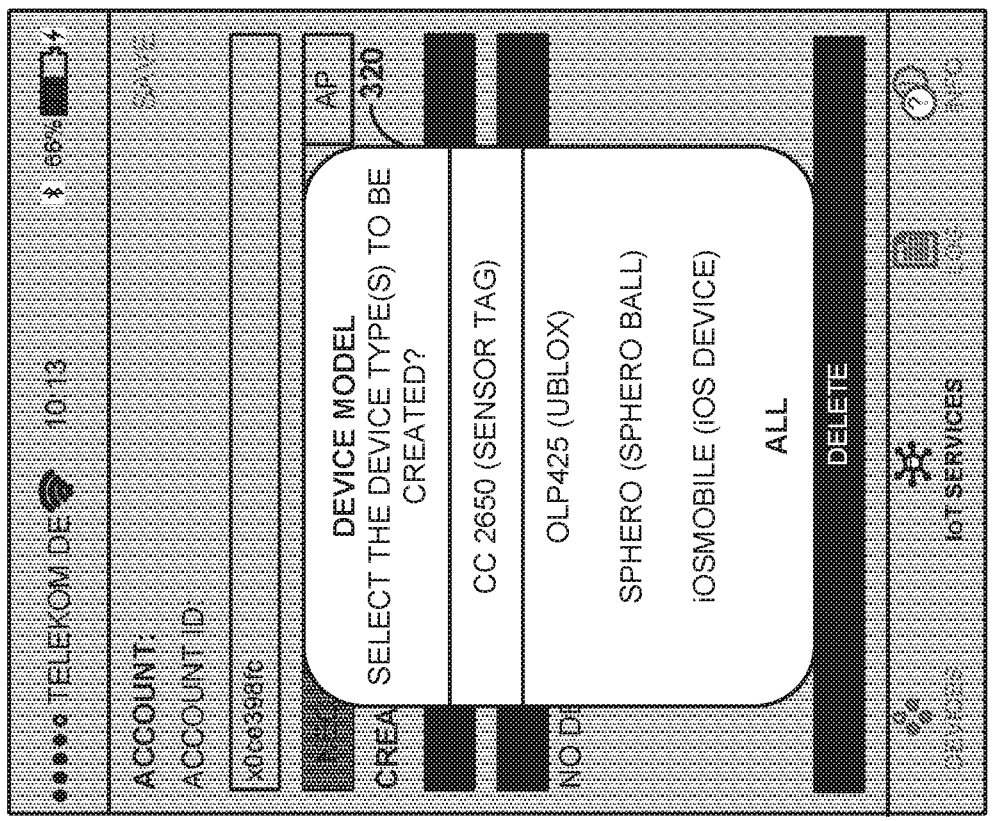
FIG. 3A is an exemplary graphical user interface (GUI) illustrating an IoT gateway application, according to an embodiment.

FIG. 3A is an exemplary graphical user interface (GUI) illustrating an IoT gateway application, according to an embodiment. The GUI depicts the use of the IoT gateway application to demonstrate capabilities of IoT services. For example, the GUI of the IoT gateway application enables to create an account for a client (e.g., 305) with authentication. Further, the GUI of the IoT gateway application displays different landscapes or data centers (e.g., "NEO", "TRIAL", "EU", "US1", "US2" and "AP") for the client to select the landscape for communicating the data. In one exemplary embodiment, at least one landscape (e.g., 310) is selected for communicating the data. Also, the GUI enables to generate a device model (e.g., 315) to configure different devices. In one example, the device model is generated upon receiving a selection of "create device model" (e.g., 315).

FIG. 3B is an exemplary graphical user interface (GUI) illustrating generating a device model, according to an embodiment. Generating the device model may include receiving a selection one or more device types from a list of device types. In an IoT gateway application, the list of device types may be available (e.g., as templates, which are manually entered) or generated automatically based on device information (e.g., devices that are currently available or connected to the IoT gateway application). Therefore, an option (e.g., 320) is provided to select one or more device types. For example, the device types can be, but not limited to, "CC2650", "OLP425". "SPHERO", and "iOS Mobile". Upon receiving the selection of the device types, the device model is generated having device specific message type definitions supported by the device types. Thereby, information (e.g., identifiers and supported message type definitions) is available in the IoT gateway application.

Figures 4A, 4B:
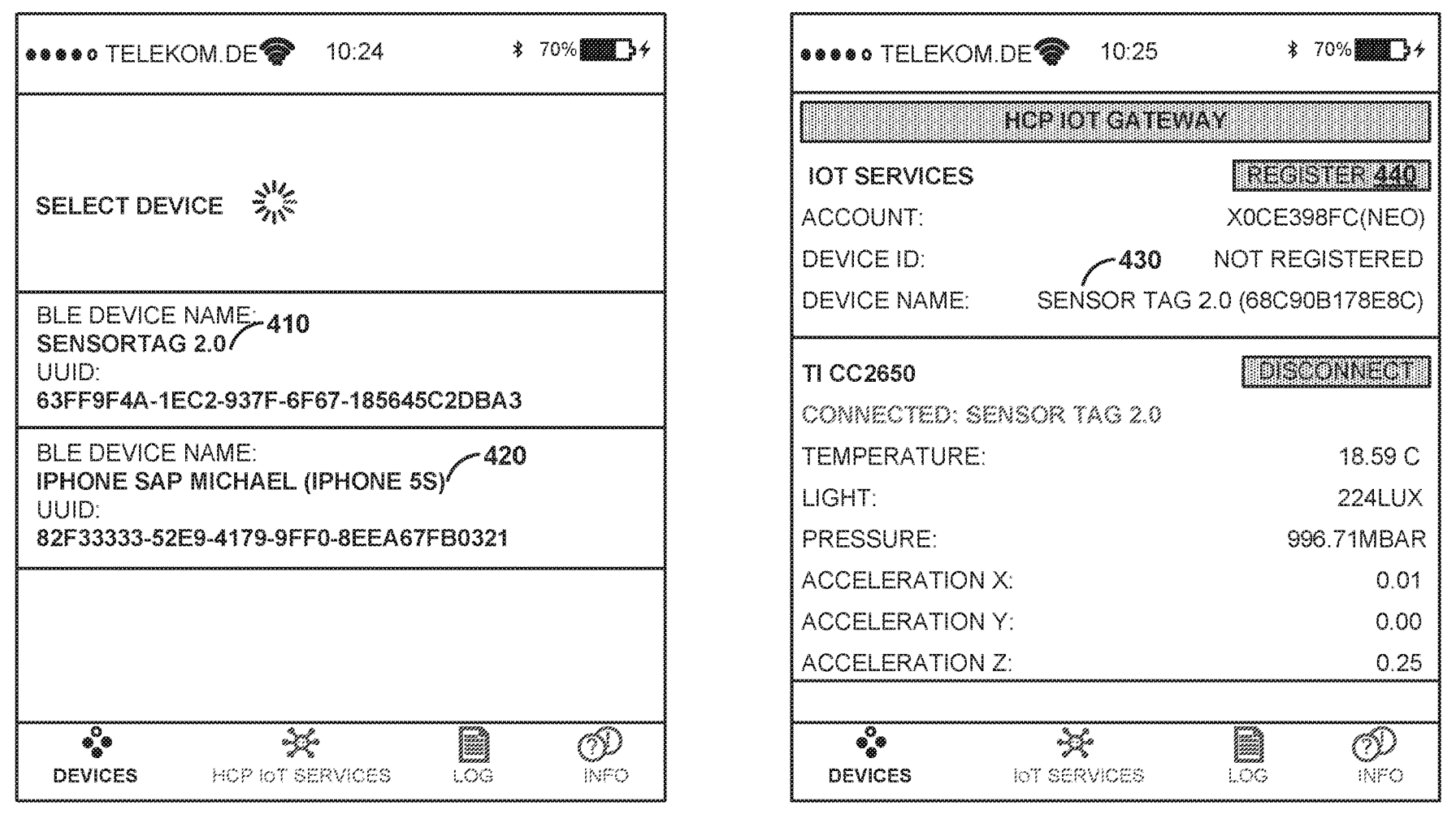

FIG. 4A is an exemplary graphical user interface (GUI) illustrating selecting a device for registration, according to an embodiment. The GUI may display a list of devices corresponding to device types in a device model. Further, the devices may support wireless or wired communication (e.g., Insteon®, Infrared Data Association (IrDA®), Bluetooth®, Z-Wave®, ZigBee®, Controller Area Network (CAN) bus and Body Area Network (BAN)) and active in the vicinity of the client device. In the example, the devices "Sensor Tag" (e.g., 410) and "phone" (e.g., 420) in the device model are displayed. Further, the GUI enables a client to select at least one device for communicating data via the Internet.

FIG. 4B is an exemplary graphical user interface (GUI) illustrating registering the selected device for communicating data with a landscape, according to an embodiment. Upon receiving a selection of the device from a GUI of FIG. 4A, the GUI of FIG. 4B enables to register the device. In the example, upon receiving the selection of the device "Sensor Tag" (e.g., 430), the device "Sensor Tag" can be registered (e.g., 440).

Figure 5A:
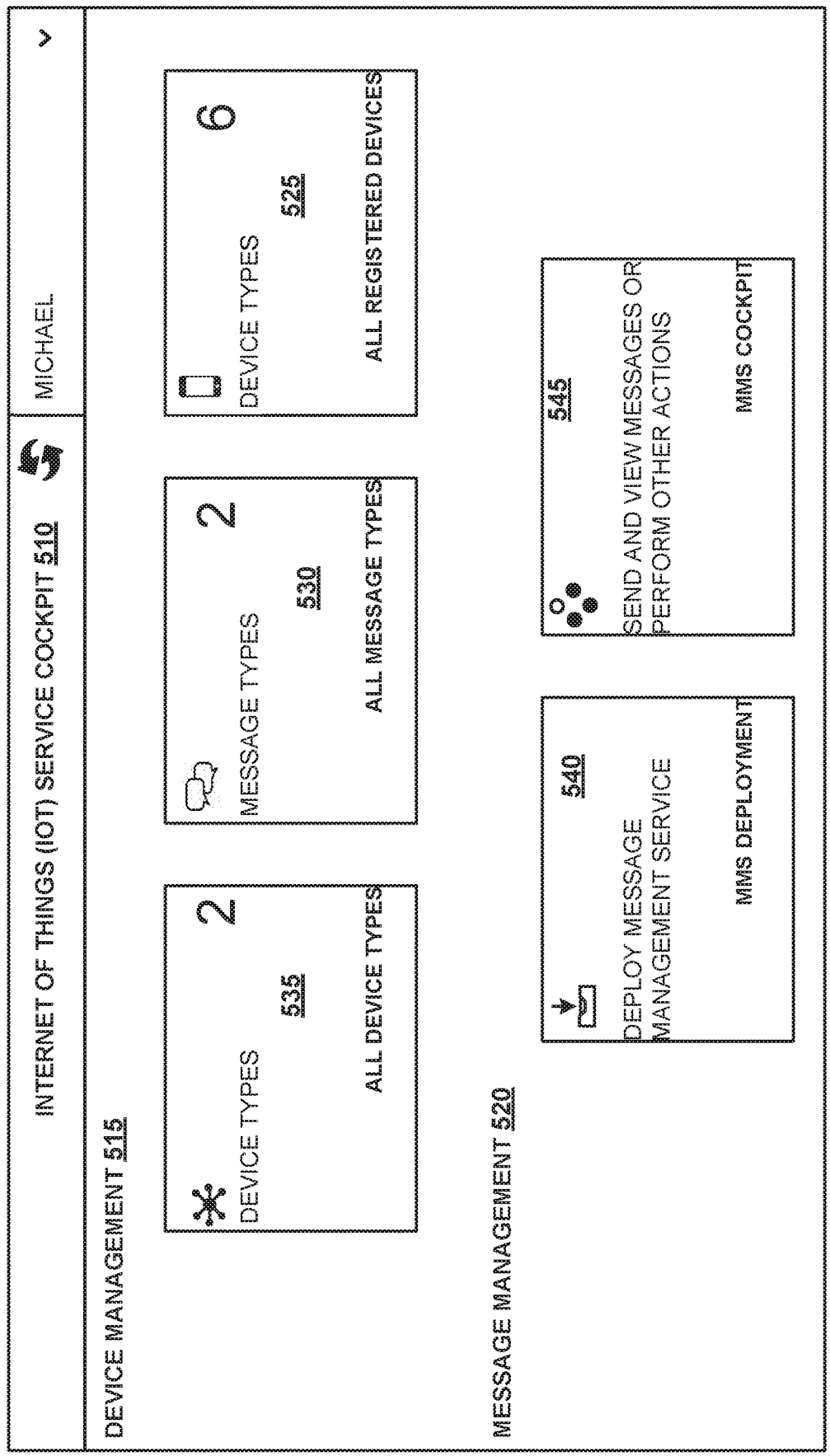
FIG. 5A is an exemplary graphical user interface (GUI) illustrating IoT service cockpit 510, according to an embodiment.

FIG. 5A is an exemplary graphical user interface (GUI) illustrating IoT service cockpit 510, according to an embodiment. The IoT service cockpit 510 may display multiple offered services, such as, but not limited to device management services (e.g., 515) and message management service (e.g., 520) for a client account (e.g., account "Michael"). The device management services 515 may provide information such as, but not limited to, a number of devices registered for the IoT services (e.g., 525), a number of device types (e.g., 535), and a number of supported message type definitions (e.g., 530). Further, the message management services 520 may display different actions performed with data. For example, the actions may include "deploy message management service" (e.g., 540) and "send and view messages or perform other actions" (e.g., 545).

Figure 5B:
FIG. 5B is an exemplary graphical user interface (GUI) displaying a list of device types in a device model associated with a client account, according to an embodiment.

FIG. 5B is an exemplary graphical user interface (GUI) displaying a list of device types in a device model associated with a client account, according to an embodiment. In the exemplary IoT service cockpit of FIG. 5A, when "device types" (e.g., 535 of FIG. 5A) is selected, a list of configured device types associated with the client account (e.g., account "Michael") are displayed. In the example, device type "CC2650" (e.g., 550) is displayed when the "device types" is selected. The device type "CC2650" is associated with a device "Sensor Tag". In one example embodiment, a device type identifier (ID) (e.g., 555) and a device registration token (e.g., 560) are pushed from an IoT gateway application of a client device to the IoT service cockpit upon registering the device in the IoT gateway application. Therefore, the device type identifier (ID) 555 and the device registration token 560 may be displayed and thus allow automatic onboarding of the device "Sensor Tag".

Figure 5C:
FIG. 5C is an exemplary graphical user interface (GUI) illustrating a message type of a device type, according to an embodiment.

FIG. 5C is an exemplary graphical user interface (GUI) illustrating a message type of a device type, according to an embodiment. In the exemplary IoT service cockpit of FIG. 5A, when "message types" (e.g., 530 of FIG. 5A) is selected, a list of supported message types are displayed. In the example, when "message type" corresponding to the device type "CC2650" (e.g., 565) and "fields" icon are selected, data structure supported by the device type "CC2650" is displayed (e.g., 570). The message type may allow to generate a message format as the IoT may result in heterogeneous message formats. For example, message type includes, but not limited to, "double" for parameters "light" and "temperature", and "long" for parameter "timestamp".

FIG. 5D is an exemplary graphical user interface (GUI) displaying communicated data or messages, according to an embodiment. In the exemplary IoT service cockpit of FIG. 5A, when "send and view messages" (e.g., 545 of FIG. 5A) is selected, a structured data or messages (e.g., based on device specific message type definition) from the device "Sensor Tag" are displayed as shown in FIG. 5D.

Figure 6:
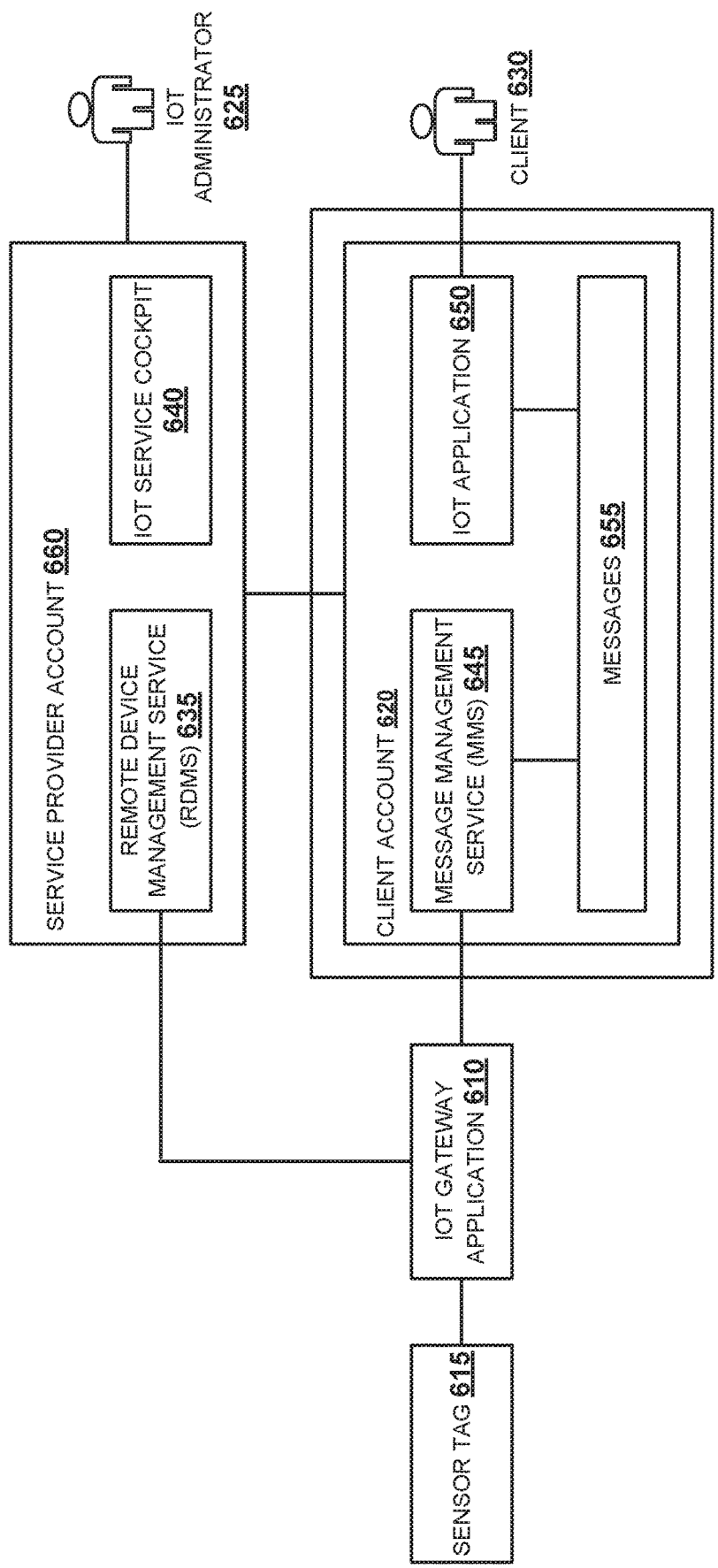
FIG. 6 is a block diagram illustrating a high level architecture of Internet of Things (IoT) gateway, according to an embodiment.

FIG. 6 is a block diagram illustrating a high level architecture of Internet of Things (IoT) gateway, according to an embodiment. The block diagram illustrates an IoT gateway application 610, which enables onboarding of IoT device "Sensor Tag" 615 to use the capabilities of IoT services (e.g., remote device management services, message management services and the like).

In one exemplary embodiment, client 630 selects the IoT gateway application 610. Upon selecting the IoT gateway application 610, a list of device types are provided for the client 630. Further, the client 630 may select one or more device types for generating a device model in the IoT gateway application 610. For selecting the device types, a list of device types may be available (e.g., as templates, which are manually entered) or generated automatically based on device information (e.g., devices that are currently available or connected to the IoT gateway application). The device model may include one or more device types and corresponding device specific message type definitions. In the example, the client 630 may select device type "CC2650" (e.g., for the device "Sensor Tag" 615). Thereby, the device model in the IoT gateway application 610 may include the device type "CC2650" and supporting message type "CC2650Data". Upon generating the device model, the client 630 is provided a list of devices corresponding to the device types. Further, the client 630 may provide an instruction to register one or more devices from the list of devices. In the example, when the client 630 provides the instruction to register the device "Sensor Tag" 615, the device "Sensor Tag" 615 gets registered with the IoT gateway application. Further, messages 655 associated with the device "Sensor Tag" 615 may be communicated via the Internet when IoT application 650 is executed.

In one exemplary embodiment, a remote device management service (RDMS) (e.g., 635) supported in service provider account 660 may generate the device model and register the device "Sensor Tag" 615 and corresponding device specific message type "CC2650Data". A message management service (MMS) (e.g., 645) supported in client account 620 may communicate the data or messages (e.g., 655) in a structured format to a selected landscape. Further, the IoT services can be accessed via IoT service cockpit 640 controlled by IoT administrator 625. Therefore, the device "Sensor Tag" 615 is configured at a client device using the IoT gateway application 610.

The embodiments described herein demonstrates the IoT services capabilities for connecting the IoT devices equipped with wireless or wired communication technologies. Further, the embodiments support lightweight IoT scenarios by enabling sharing configuration of the device model, which provide advantage during replacement or maintenance of the IoT gateway application.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
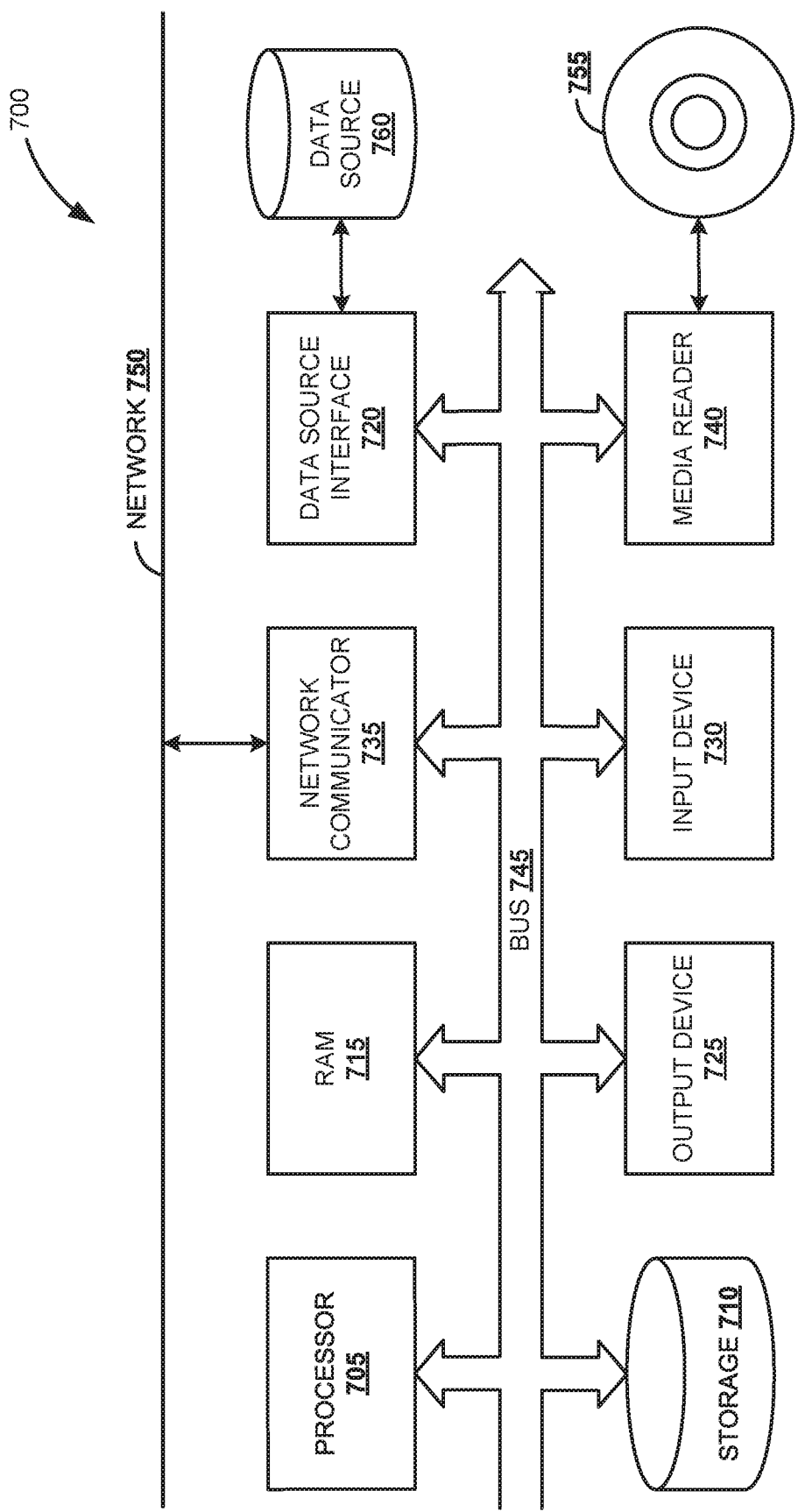
FIG. 7 is a block diagram illustrating an exemplary computer system, according to an embodiment.

FIG. 7 is a block diagram of example computer system 700, according to an embodiment. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. One or more of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments, the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and other data sources accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a client device cause the client device to perform operations comprising:
   receiving a selection of an Internet of Things (IoT) gateway application operative to enable at least one device to use an IoT service, wherein the IoT service is at least one of a remote device management service, a message management service, and an authorization management service;
   receiving at a user interface a selection of at least one data center for communicating data or messages via the IoT gateway application;
   generating, via the IoT gateway application, a device model in the IoT gateway application, wherein the device model comprises two or more device types that exemplify a device version and corresponding device specific message type definitions, wherein the device specific message type definition includes a structured format operative to transmit messages via the IoT gateway, wherein the structured format is specific for each of the respective two or more device types;
   identifying one or more active devices in a vicinity of the client device, the one or more active devices corresponding to the two or more device types in the device model based on short-distance communication characteristics and a media access control address of the one or more devices;
   receiving a selection of one or more of the identified one or more devices;
   upon receiving a selection of one or more of the identified one or more devices, executing the IoT gateway application to register the selected one or more devices in the IoT gateway application; and
   communicating, based on the corresponding device specific message type definitions, the data or messages in the structured format from the registered one or more devices to the selected at least one data center via the selected IoT service.

2. The non-transitory computer-readable medium of claim 1, wherein the device model is generated by a remote device management service application programming interface (API).

3. The non-transitory computer-readable medium of claim 1, wherein the data is communicated by a message management service application programming interface (API).

4. The non-transitory computer-readable medium of claim 1, wherein the IoT gateway application comprises one of a web application, a native application and a hybrid application.

5. The non-transitory computer-readable medium of claim 1, wherein generating the device model comprises receiving a selection of the two or more device types.

6. The non-transitory computer-readable medium of claim 1, the operations further comprising instructions to: share configuration of the device model and the at least one data center with another client device.

7. A computer implemented method to provide an Internet of Things (IoT) gateway, comprising:
   selecting, at a client device, an IoT gateway application operative to enable at least one device to use an IoT service, wherein the IoT service is at least one of a remote device management service, a message management service, and an authorization management service;
   selecting at least one data center for communicating data or messages via the IoT gateway application;
   selecting one or more device types for generating a device model in the gateway application, wherein the device model comprises two or more device types that exemplify a device version and corresponding device specific message type definitions, wherein the device specific message type definition includes a structured format operative to transmit messages via the IoT gateway, wherein the structured format is specific for each of the respective two or more device types;
   identifying one or more active devices in a vicinity of the client device, the one or more active devices corresponding to the two or more device types in the device model based on short-distance communication characteristics and a media access control address of the one or more devices;

selecting one or more devices from a list of active devices corresponding to the two or more device types in the device model;

providing an instruction to register the selected one or more devices;

registering, via execution of the IoT gateway application, the selected one or more devices in the IoT gateway application; and communicating, based on the corresponding device specific message type definitions, the data or messages in the structured format from the registered one or more devices to the selected at least one data center via the selected IoT service.

8. The computer implemented method of claim 7, wherein the IoT gateway application comprises one of a web application, a native application and a hybrid application.

9. The computer implemented method of claim 7, wherein the device model is generated by a remote device management service application programming interface (API) and the data is communicated by a message management service API.

10. The computer implemented method of claim 7, wherein the two or more device types in the IoT gateway application are manually entered or generated based on device information.

11. The computer implemented method of claim 7, further comprising providing an instruction to share configuration of the device model and the at least one data center with another client device.

12. A computing system to provide Internet of Things (IoT) gateway, comprising:

at least one processor; and one or more memory devices communicative with the at least one processor, wherein the one or more memory devices store instructions to:

receive a selection of an Internet of Things (IoT) gateway application operative to enable at least one device to use an IoT service, wherein the IoT service is at least one of a remote device management service, a message management service, and an authorization management service;

receive at a user interface a selection of at least one data center for communicating data or messages via the IoT gateway application;

generate, via the IoT gateway application, a device model in the IoT gateway application, wherein the device model comprises two or more device types that exemplify a device version and corresponding device specific message type definitions, wherein the device specific message type definition includes a structured format operative to transmit messages via the IoT gateway, wherein the structured format is specific for each of the respective two or more device types;

identify one or more active devices in a vicinity of the client device, the one or more active devices corresponding to the two or more device types in the device model based on short-distance communication characteristics and a media access control address of the one or more devices;

receiving a selection of one or more of the identified one or more devices;

upon receiving a selection of one or more of the identified one or more devices, executing the IoT gateway application to register the selected one or more devices in the IoT gateway application; and communicate, based on the corresponding device specific message type definitions, data or messages in the structured format from the registered one or more devices to the selected at least one data center via the selected IoT service.

13. The computing system of claim 12, wherein the IoT gateway application comprises one of a web application, a native application, and a hybrid application.

14. The computing system of claim 12, wherein the device model is generated by a remote device management service application programming interface (API).

15. The computing system of claim 12, wherein the data is communicated by a message management service application programming interface API.

16. The computing system of claim 12, wherein generating the device model comprises receiving a selection of the two or more device types.

17. The computing system of claim 12, further comprising instructions to: share configuration of the device model and the at least one data center associated with a client device with another client device.

* * * * *